United States Patent
Wu et al.

(10) Patent No.: US 7,079,657 B2
(45) Date of Patent: Jul. 18, 2006

(54) SYSTEM AND METHOD OF PERFORMING DIGITAL MULTI-CHANNEL AUDIO SIGNAL DECODING

(75) Inventors: David Chaohua Wu, San Diego, CA (US); Hoang Nhu, Irvine, CA (US); Russ Lambert, Fountain Valley, CA (US); Alexander G. MacInnis, Los Altos, CA (US); Ronald Crochiere, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 845 days.

(21) Appl. No.: 10/083,052

(22) Filed: Feb. 26, 2002

(65) Prior Publication Data

US 2003/0161477 A1 Aug. 28, 2003

(51) Int. Cl.
*H04H 5/00* (2006.01)
(52) U.S. Cl. ........................................... 381/2
(58) Field of Classification Search ............... 381/2, 381/3
See application file for complete search history.

(56) References Cited

U.S. PATENT DOCUMENTS

| 4,747,140 A * | 5/1988 | Gibson ........................... 381/3 |
| 6,664,841 B1 * | 12/2003 | Cetin et al. .................. 327/309 |
| 2003/0087618 A1 * | 5/2003 | Li et al. ....................... 455/260 |

* cited by examiner

*Primary Examiner*—Brian T. Pendleton
(74) *Attorney, Agent, or Firm*—McAndrews, Held & Malloy, Ltd.

(57) ABSTRACT

A system and method are disclosed for performing digital multi-channel decoding of a BTSC composite audio signal. Analog-to-digital conversion is performed on a composite analog audio signal at a fast clock rate to generate a composite digital audio signal at a first sample rate. Digital frequency compensation is performed on the composite digital audio signal at the first sample rate to generate a compensated composite audio signal. Digital channel demodulation and filtering are performed on the compensated composite audio signal at the first sample rate to generate a first single channel audio signal at a second sample rate.

5 Claims, 9 Drawing Sheets

Pilot Detection and DSB Demodulation

$$H1(s) = \frac{\frac{s}{5.23 \times 2\pi} + 1}{\frac{s}{0.408 \times 2\pi} + 1} \times \frac{\frac{s}{62.5 \times 2\pi} + 1}{\frac{s}{2.19 \times 2\pi} + 1}$$

$$H2(s) = \frac{1 + \left(\frac{s}{20.1 \times 2\pi}\right)\left(\frac{b + 51 b}{b + 1}\right)}{1 + \left(\frac{s}{20.1 \times 2\pi}\right)\left(\frac{1 + 51}{b + 1}\right)}$$

$$H3(s) = a$$

$$H4(s) = \frac{\left(\frac{s}{7.66 \times 2\pi}\right)^2}{\left[\left(\frac{s}{7.66 \times 2\pi}\right)^2 + \left(\frac{s}{7.31 \times 2\pi}\right) + 1\right]} \times \frac{1}{\left[\left(\frac{s}{26.9 \times 2\pi}\right) + 1\right]} \times \frac{\left(\frac{s}{3.92 \times 2\pi}\right)}{\left[\left(\frac{s}{3.92 \times 2\pi}\right) + 1\right]}$$

$$H5(s) = \frac{a2}{s + a2}$$

$$H6(s) = \frac{\left(\frac{s}{0.0354 \times 2\pi}\right)}{\left(\frac{s}{0.0354 \times 2\pi} + 1\right)\left(\frac{s}{2.09 \times 2\pi} + 1\right)}$$

$$H7(s) = \frac{a1}{s + a1}$$

165

$$H1(z) = \frac{(0.0857 - 0.0696z^{-1})(0.0909 - 0.0076z^{-1})}{(1.0 - 0.9839z^{-1})(1.0 - 0.9167z^{-1})}$$

165A $$H2(z) = \frac{(103*b+3) - z^{-1}(101*b+1)}{(3*b+3) - z^{-1}(b+101)}$$

$$H3(z) = a$$

$$H4(z) = \frac{0.5715 * 0.45085 * (1 - z^{-1})^3}{(1.0 - 2.0 * 0.5997 z^{-1} + 2.0 * 0.1470 z^{-2})(1.0 - 2.0 * 0.8242 z^{-1} + 2.0 * 0.3635 z^{-2})}$$

$$H5(z) = \frac{0.047^2}{1 - 0.99945 z^{-1}}$$

$$H6(z) = \frac{0.07959 (1 - z^{-2})}{1 - 2.0 * 0.9595 z^{-1} + 2.0 * 0.4595 z^{-2}}$$

$$H7(z) = \frac{0.02699^2}{1 - 0.9998 z^{-1}}$$

The square root calculation is done through the following equation
  y[0] = 0.66667 * sq_in + 0.354167
  sqrt = coef12 * (sq_in − y[0] * y[0]) + y[0]
The value of sq_in is between 1.0 to 0.25, and coef12 is one of 12 coefficients chosen based on sq_in.

| CODE | INSTRUCTION | CYCLES | DESCRIPTION |
|---|---|---|---|
| 0 | nop | 1 | no operation |
| 1 | mant | 1 | mantissa and exponent generation from 40-b register |
| 2 | sigshf | 1 | convert from mantissa and exponent to fixed-point signal |
| 3 | mults | 1 | multiplication and subtraction |
| 4 | multa | 1 | multiplication and add |
| 5 | fos | 3 | micro code do 20-b 1st order IIR filter which is made of 3 mults/multa |
| 6 | sos | 5 | micro code does 20-b 2nd order IIR filter which is made of 5 mults/multa |
| 7 | rms | 6 | micro code does 20-b square and 40-b 1st order IIR filter, which is consisted of 6 mults/multa |
| 8 | halt | 1 | halt programe |
| 9 | setli | 1 | setup inner loop |
| 10 | setlo | 1 | setup outer loop |
| 11 | jmpif | 1 | conditional jump |
| 12 | call | 1 | call routine |
| 13 | cmp | 1 | compare two register value and store 1-b result in status register |
| 14 | fos2 | 6 | micro code does 40-b 1s order IIR filter, which is consisted of 6 mults/multa |
| 15 | dload | 1 | directly store coded data to register ram location |

Fig. 7

SYSTEM AND METHOD OF PERFORMING DIGITAL MULTI-CHANNEL AUDIO SIGNAL DECODING

RELATED APPLICATIONS

The application Ser. No. 10/083,052 herein references the following applications having Ser. Nos. 10/083,076, 10/082,950, 10/083,203, and 10/083,201 filed on the same day as the application herein Ser. No. 10/083,052 was filed.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Certain embodiments of the present invention relate to the processing of multi-channel television signals. More specifically, certain embodiments relate to a system and method for digitally decoding BTCS (Broadcast Television System Committee) audio signals.

During the 1980's, the FCC adopted the BTSC format as a standard for multi-channel television sound (MTS). Typically, the BTSC format is used with a composite TV signal that includes a video signal as well as the BTSC format for the sound reproduction.

The BTSC format is similar to FM stereo but has the ability to carry two additional audio channels. Left plus right (L+R) channel mono information is transmitted in a way similar to stereo FM in order to ensure compatibility with monaural television receivers. A 15.734 KHz pilot signal is used, instead of the FM stereo 19 KHz pilot signal, which allows the pilot signal to be phase-locked to the horizontal line frequency. A double sideband-suppressed carrier at twice the frequency of the pilot transmits the left minus right (L−R) stereo information. The stereo information is DBX encoded to aid in noise reduction. An SAP channel is located at 5 times the pilot frequency. The SAP channel may be used for second language or independent source program material. A professional audio channel may be added at 6.5 times the pilot frequency in order to accommodate additional voice or data.

Stereo tuners and demodulator units capable of decoding the BTSC format have been on the market for some time. The front end of the units typically includes analog components or integrated circuit chips. Traditionally, BTSC decoding has been done in the analog domain requiring larger, more expensive implementations that consume a significant amount of power. Previous digital implementations may not be optimized, requiring many clock cycles to perform various processing functions.

It is desirable to perform BTSC decoding in the digital domain on a block of an ASIC chip such that the implementation is optimized for reduced complexity and cost. By reducing the complexity, fewer clock cycles are required for processing, and power consumption is also reduced.

Further limitations and disadvantages of conventional and traditional approaches will become apparent to one of skill in the art, through comparison of such systems with embodiments of the present invention as set forth in the remainder of the present application with reference to the drawings.

A need exists for an approach to perform efficient multi-channel audio signal decoding in the digital domain by reducing the complexity of the hardware required, therefore reducing cost and power consumption.

BRIEF SUMMARY OF THE INVENTION

An embodiment of the present invention provides efficient, low cost digital multi-channel audio signal decoding of BTSC audio signals in the digital domain. In such an environment, several stages of digital signal processing are used where each subsequent stage of the digital multi-channel decoding process is performed at the lowest sampling rate that yields acceptable performance for that stage. Efficient pipelined processing is used to execute the various processing functions in order to reduce clock cycles and addressing to memory.

A method is provided for performing digital multi-channel decoding of a DBX-encoded composite audio signal. Each subsequent stage of the digital multi-channel decoding process is performed at the lowest sampling rate that yields acceptable performance for that stage. Analog-to-digital conversion of the composite audio signal is performed first to generate a composite digital audio signal. After analog-to-digital conversion, all signal processing may be performed in the digital domain. The composite digital audio signal is digitally filtered to compensate for uneven frequency response caused by previous stages of processing, including IF demodulation. Digital channel demodulation and filtering are performed to isolate single channels of the composite digital audio signal such as SAP, L−R, and L+R channels. SAP and L−R channels are DBX decoded resulting in corresponding decoded signals using a unique combination of digital filters that are an efficient translation of a corresponding combination of analog filters. The decoded L−R channel and the L+R channel are re-matrixed to form left and right stereo signals. Any of the SAP signal, left and right stereo signals, and L+R channel signal may be sample rate converted and output at a standard audio output rate.

A system is provided on an ASIC chip for performing digital multi-channel audio signal decoding. The system comprises a sigma-delta analog-to-digital (A/D) conversion block operating on a composite analog audio signal to generate a composite digital audio signal, a clock generation block generating a master clock signal and other clock signals used in the multi-channel audio signal decoding process, and a DSP processing block including a five-stage pipelined data path performing certain digital multi-channel audio signal processing functions in response to a set of instructions. The system further includes an input buffer block connected between the sigma-delta A/D conversion block and the DSP processing block to transfer the composite digital audio signal to the DSP processing block, a configuration register block interfacing to the DSP processing block, the input buffer block, and the sigma-delta A/D conversion block, and an output buffer block interfacing to the DSP processing block and the clock generation block to output standard audio output signals at standard audio output rates. The five-stage pipelined data path comprises a memory address calculation stage, a memory data fetch stage, a multiplication stage, an accumulation/mantissa-generation/signal-shifter stage, and a registers/memory-write stage.

Certain embodiments of the present invention afford an approach to achieve efficient, low cost digital multi-channel audio signal decoding of BTSC audio signals in the digital domain. Certain embodiments of the present invention use several stages of digital signal processing where each subsequent stage of the digital multi-channel decoding process is performed at the lowest sampling rate that yields acceptable performance for that stage.

BRIEF DESCRIPTION OF THE DRAWINGS

FIG. 4 illustrates the translated analog and digital transfer function equations corresponding to the DBX decoding performed in FIG. 3 in accordance with an embodiment of the present invention.

DETAILED DESCRIPTION OF THE INVENTION

Figure 1:
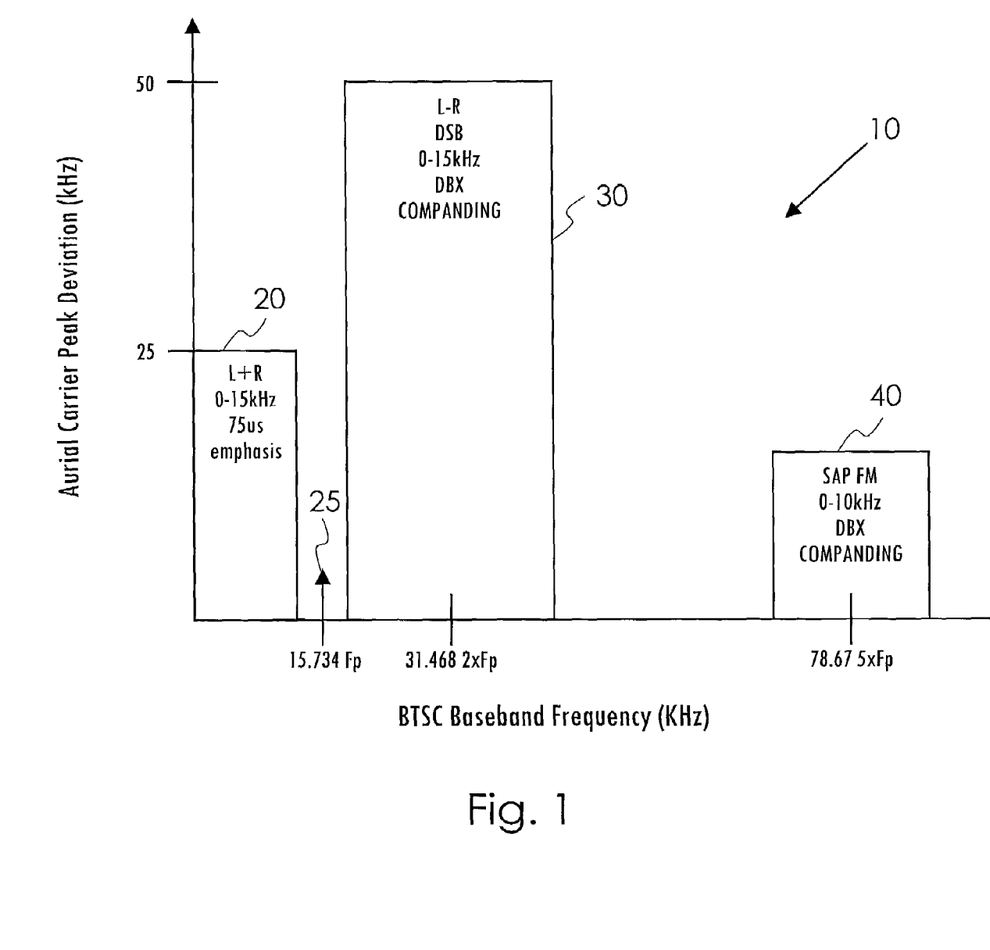
FIG. 1 is an illustration of the various components of a composite audio signal to be decoded in accordance with an embodiment of the present invention.

FIG. 1 is an illustration of the various components of a BTSC composite audio signal 10 to be decoded in accordance with an embodiment of the present invention. During the 1980's, the FCC adopted the BTSC format as a standard for multi-channel television sound (MTS). Typically, the BTSC format is used with a composite TV signal that includes a video signal as well as the BTSC format for the sound reproduction.

The BTSC format is similar to FM stereo but has the ability to carry two additional audio channels. Left plus right (L+R) channel mono information 20 is transmitted in a way similar to stereo FM in order to ensure compatibility with monaural television receivers. A 15.734 KHz pilot signal 25 is used, instead of the FM stereo 19 KHz pilot signal, which allows the pilot signal 25 to be phase-locked to the horizontal line frequency. A double sideband-suppressed carrier, at twice the frequency of the pilot, transmits the left minus right (L−R) stereo information 30. The stereo information is DBX encoded to aid in noise reduction. An SAP channel 40 is located at 5 times the pilot frequency. The SAP channel 40 may be used for second language or independent source program material. A professional audio channel (not shown) may be added at 6.5 times the pilot frequency 25 in order to accommodate additional voice or data.

Figure 2:
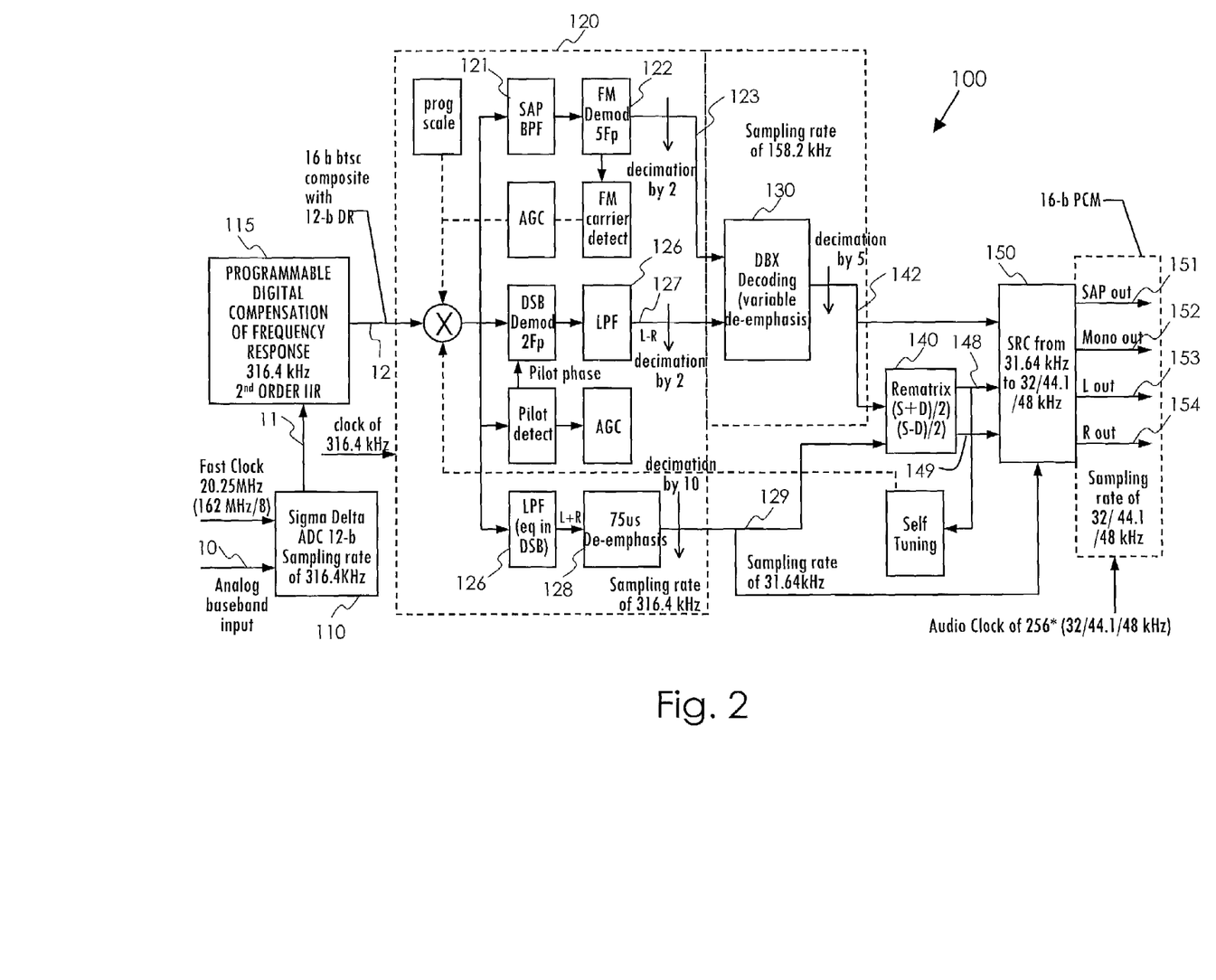
FIG. 2 is a schematic functional block diagram of the decoding method used to decode the composite audio signal of FIG. 1 in accordance with an embodiment of the present invention.

FIG. 2 is a schematic functional block diagram of the decoding method 100 used to decode the BTSC composite audio signal 10 of FIG. 1 in accordance with an embodiment of the present invention. The method 100 comprises analog-to-digital conversion 110, digital amplitude compensation 115, digital channel demodulation and filtering 120, DBX decoding 130, stereo re-matrixing 140, and sample rate conversion 150.

The composite audio signal 10 is an analog base-band signal and is converted to a composite digital audio signal 11 in the analog-to-digital conversion step 110. As a result, subsequent processing may be performed in the digital domain. The analog-to-digital conversion step 110 operates at a clock rate of 20.25 MHz which is created by dividing down a master clock signal of 162 MHz by a factor of eight as shown in FIG. 2. The composite digital audio signal 11 is output from the analog-to-digital conversion step 110 at a sample rate of 316.4 KHz and is presented to the digital amplitude compensation step 115. The sample rate of 316.4 KHz is derived from the master clock signal by dividing down by a factor of 512.

Step 115, the compensation of uneven frequency response, applies a second-order IIR filter to digitally compensate for amplitude unevenness in the composite digital audio signal due to an uneven frequency response of a previous IF demodulation stage that is not part of the decoding process described herein. The output of the digital amplitude compensation step 115 is a compensated composite audio signal 12 at a sample rate of 316.4 KHz.

The compensated composite audio signal 12 is sent to the digital channel demodulation and filtering step 120. Step 120 also operates at the sample rate of 316.4 KHz and effectively breaks up the compensated composite audio signal into the individual signal components including the left plus right (L+R) channel mono signal 20, the 15.734 KHz pilot signal 25, the left minus right (L−R) stereo signal 30, and the SAP signal 40.

The SAP signal 40 is centered at five times the pilot signal 25 at a frequency of 78.67 KHz. In order to demodulate this part of the composite audio signal, step 120 first applies a band-pass FIR filter 121 to remove the L+R 20 and L−R 30 stereo channels and the professional channel if it is present in the composite signal. Step 20 then performs FM demodulation 122 by applying a Hilbert filter, a demodulation equation, and a low-pass filter to generate the FM demodulated SAP audio signal 123. The resultant demodulated SAP audio signal 123 is at a sample rate of 158.2 KHz which is the master clock signal divided by 1024. Further details about demodulating the SAP component 40 of the composite audio signal 10 may be found in the application entitled "System and Method for SAP FM Demodulation" filed under Ser. No. 10/083,076 on the same day as the application herein Ser. No. 10/083,052 was filed.

Figure 2B:
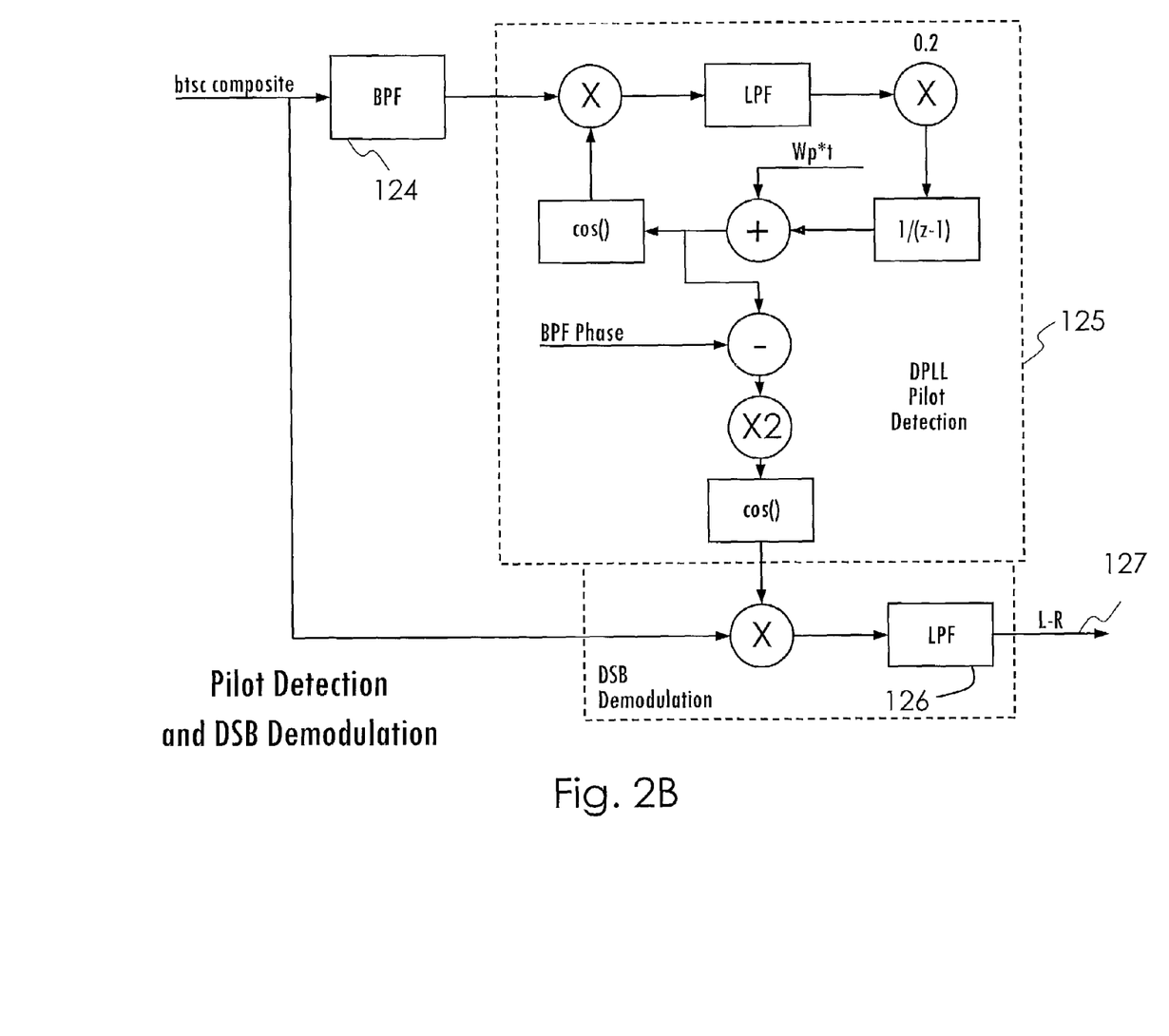
FIG. 2B is a schematic functional block diagram of pilot signal detection and DSB demodulation performed in the method of FIG. 2 in accordance with an embodiment of the present invention.

The left minus right (L−R) stereo signal 30 is centered at twice the pilot signal frequency at 31.468 KHz and is a double sideband (DSB) suppressed carrier signal. According to FCC OET 6, the phase of the pilot signal 25 should be synchronized with the phase of the L−R DSB signal 30 to within three degrees in order to properly demodulate the signal. The phase of the L−R DSB signal 30 may be recovered by employing a digital phase-locked loop (DPLL) that is locked to the phase of the pilot signal 25. Referring to FIG. 2B, to perform the DPLL function, an eigth-order IIR band-pass filter 124 is applied to the digitized BTSC composite signal. The output of the band-pass filter 124 is then applied to a configuration 125 comprising a phase detector, a cosine look-up-table (LUT), and a loop filter as shown in FIG. 2B which also performs detection of the pilot signal 25 as part of the DPLL process. Finally DSB demodulation is performed using the same cosine look-up-table (LUT) and a tenth-order elliptical IIR low-pass filter 126 also shown in FIG. 2B. The low-pass filter 126 has a pass-band ripple of −0.1 dB at 13 KHz, 50 dB of attenuation at 15.734 KHz (the pilot signal frequency), and over 80 dB of attenuation above 19 KHz. The output is a demodulated version 127 of the left minus right (L−R) stereo signal 30 at a sample rate of 158.2 KHz as shown in FIG. 2 and FIG. 2B. Further details about demodulating the L−R DSB component 30 of the composite audio signal 10 may be found in the application entitled "System and Method of Performing Analog Multi-Channel Audio Signal Amplitude Correction" filed under Ser. No. 10/083,203 on the same day as the application herein Ser. No. 10/083,052 was filed, and in the application "Pilot Tone Based Automatic Gain Control System and Method" filed under Ser. No. 10/083,201 on the same day as the application herein Ser. No. 10/083,052 was filed.

Step 120 is also used to demodulate the left plus right (L+R) channel mono signal 20. The L+R signal 20 is first applied to the same tenth-order elliptical low-pass filter 126 having a pass-band ripple of −0.1 dB at 13 KHz, 50 dB of attenuation at 15.734 KHz (the pilot signal frequency), and over 80 dB of attenuation above 19 KHz.

In FM systems, the noise accompanying a received audio signal increases rapidly in the higher audio frequency range. To offset the effect, at the transmitter the audio signal is pre-emphasized to raise the level of the higher audio frequencies relative to the lower audio frequencies. As a result, the received audio signal needs to be de-emphasized, yielding an overall flat audio frequency response while greatly reducing the effects of noise introduced by the transmission process.

To accomplish the de-emphasis of the L+R signal 20, the output of the low-pass filter 126 in fed to a 75 micro-second de-emphasis digital filter 128. In an embodiment of the present invention, the transfer function of the de-emphasis digital filter 128 is $$H_{75us}(z) = \frac{0.04126}{1 - 0.47937 z^{-1}} \quad [1]$$

The resultant L+R demodulated audio signal 129 is at a sample rate of 31.64 KHz which is the master clock frequency of 162 MHz divided down by a factor of 5120. As shown in FIG. 2, the demodulated L+R audio signal 129 may be fed to re-matrixing step 140 or to sample rate conversion step 150.

Both the left minus right (L−R) stereo channel 30 and the SAP channel 40 are originally DBX encoded on transmit to aid in noise reduction. DBX encoding is also known as signal companding. Signal companding is a technique used to reduce the effects of noise introduced by signal losses, circuit limitations, and interference during transmission of an audio signal. The audio signal to be transmitted is first dynamically compressed by a certain factor to reduce the overall dynamic range of the audio signal. Upon reception, the audio signal is expanded by a corresponding factor, thereby restoring the original dynamic range of the audio signal and reducing transmission noise.

Figure 3:
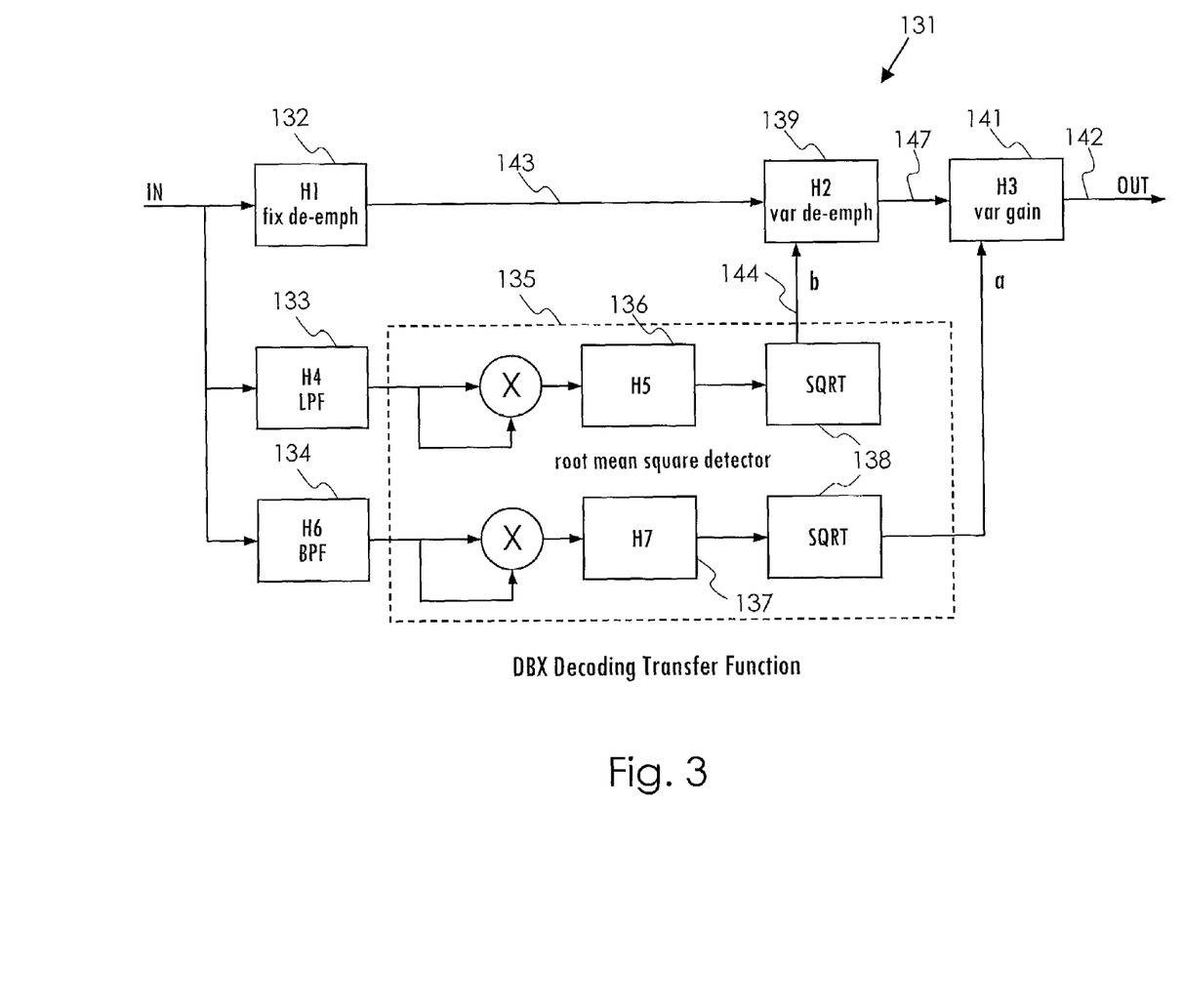
FIG. 3 is a schematic functional block diagram of a combination of digital filter transfer functions used to perform DBX decoding in accordance with an embodiment of the present invention.

Therefore, the left minus right (L−R) stereo channel 30 and the SAP channel 40 must be DBX decoded after demodulation and filtering step 120. DBX decoding is accomplished in step 130 as shown in FIG. 2. FIG. 3 is a schematic functional block diagram of a combination of digital filters 131 used to perform DBX decoding 130 in accordance with an embodiment of the present invention. A total of seven digital filters with transfer functions H1–H7 (132, 133, 134, 136, 137, 139, and 141) are used as shown in FIG. 3. The equations of the transfer functions H1–H7 are shown in FIG. 4 in both analog form 160 and digital form 165. In an embodiment of the present invention, the analog form 160 of the transfer functions H1–H7 have been translated to the digital form 165. The digital form 165 is implemented as shown in FIG. 3. The unique combination of digital filters performs adaptive audio signal companding based on the frequency and magnitude of the incoming demodulated audio signal (e.g. SAP or L−R). DBX decoding 130 is done at a sample rate of 158.2 KHz, which is the master clock frequency of 162 MHz divided down by a factor of 1024. The output of the DBX decoding step 130 is a decoded audio signal 142 (e.g. SAP or L−R) at a sample rate of 31.64 KHz.

A feature of the DBX decoding step 130 is the efficient implementation of the transfer function H2 139 shown in FIG. 3. Transfer function H2 performs variable de-emphasis as a function of frequency and magnitude of the demodulated audio signal. A root mean square detector 135 is implemented as part of the DBX decoding step using transfer functions H5 136 and H7 137 and square root operation 138 (FIG. 4 illustrates how the square root operation is performed). An output of the root mean square detector 135 is a coefficient "b" 144 which is input to transfer function H2 and is a function of audio signal frequency and magnitude.

Figure 3B:
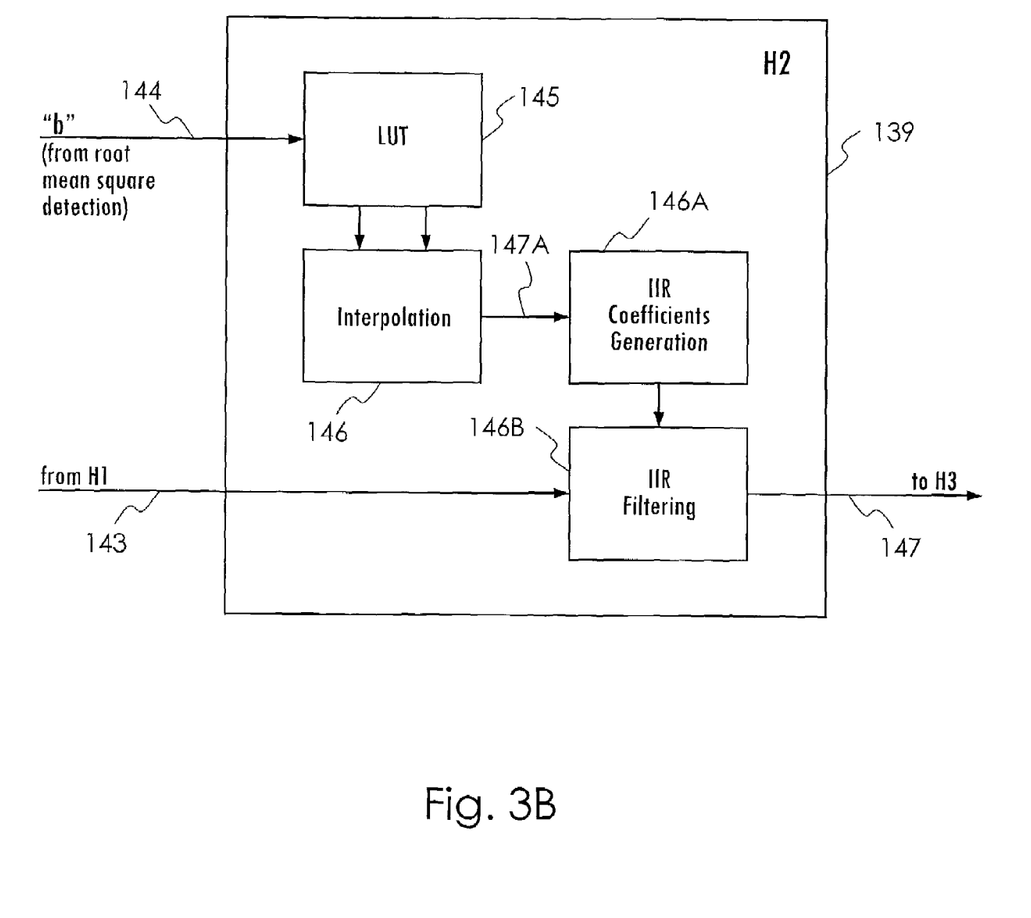
FIG. 3B is a schematic functional block diagram of a transfer function of FIG. 3 in accordance with an embodiment of the present invention.

For implementation and computation efficiency, the coefficient 147A of transfer function H2 is implemented as a look-up-table (LUT) 145 and a linear interpolator 146 as shown in FIG. 3B. The coefficient "b" 144 addresses the LUT 145 which then outputs the two nearest LUT data values corresponding to input "b". The resolution of the LUT data values is designed to be coarse, thus minimizing the number of values that need to be stored in the LUT. The interpolator 146 then interpolates between the two output data values from the LUT 145 to generate an intermediate coefficient value 147A having a finer resolution and more accurately representing the output of the LUT for the input "b". In an embodiment of the present invention, the intermediate coefficient value 147A is $$1/(3b/103+1) \quad [2]$$

The intermediate coefficient value 147A is sent to IIR coefficients generator 146A. In one embodiment of the present invention, three IIR coefficients are generated based on the intermediate coefficient value 147A and are sent to IIR filter 146B. The three IIR coefficients are $$a(1)=(b/103+101/103)/(3b/103+1) \quad [3]$$

$$b(0)=(b+3/103)/(3b/103+1) \quad [4]$$

$$b(1)=(101b/103+1/103)/(3b/103+1) \quad [5]$$

IIR filter 146B then generates output value 147 that is sent to transfer function H3 141. The configuration of FIG. 3B effectively implements the transfer function equation 165A for H2 shown in FIG. 4. As a result, the desired fine resolution of the output 147 of transfer function H2 139 may be achieved without implementing a more complicated design requiring more memory and/or more computation.

In step 140 of the decoding method 100, the DBX decoded L−R audio signal 142 and the demodulated L+R audio signal 129 may be re-matrixed to form a left audio signal 148 and a right audio signal 149 at a sample rate of 31.64 KHz. Re-matrixing 140 is accomplished as $$\text{left}=(S+D)/2 \quad [6]$$

and $$\text{right}=(S-D)/2 \quad [7]$$

where S=L+R and D=L−R. Therefore, re-matrixing 140 recovers the original stereo left 148 and right 149 audio signals.

In step 150, sampling rate conversion (SRC) is performed on the decoded SAP audio signal 142, the demodulated mono audio signal (L+R) 129, or the stereo left 148 and right 149 audio signals. Sampling rate conversion 150 is a process of translating the audio signal sampling rate of 31.64 KHz to a sampling rate including one of the standard audio output sampling rates of 32 KHz, 44.1 KHz, or 48 KHz in accordance with an embodiment of the present invention. An embodiment of the present invention accomplishes sampling rate conversion 150 by performing a combination of signal up-sampling, interpolation, and signal down-sampling.

A feature of one embodiment of the present invention with respect to sampling rate conversion 150 is that any of the resultant audio output signals (SAP out 151, mono out 152, left out 153, right out 154) may be output at any one of the three standard audio output sampling rates listed above by using the same set of low-pass filter coefficients in the SRC conversion process 150. Further details of an embodiment of sampling rate conversion may be found in the application entitled "System and Method of Performing Sample Rate Conversion" filed under Ser. No. 10/082,950 on the same day as the application herein Ser. No. 10/082,950 was filed.

Figure 5:
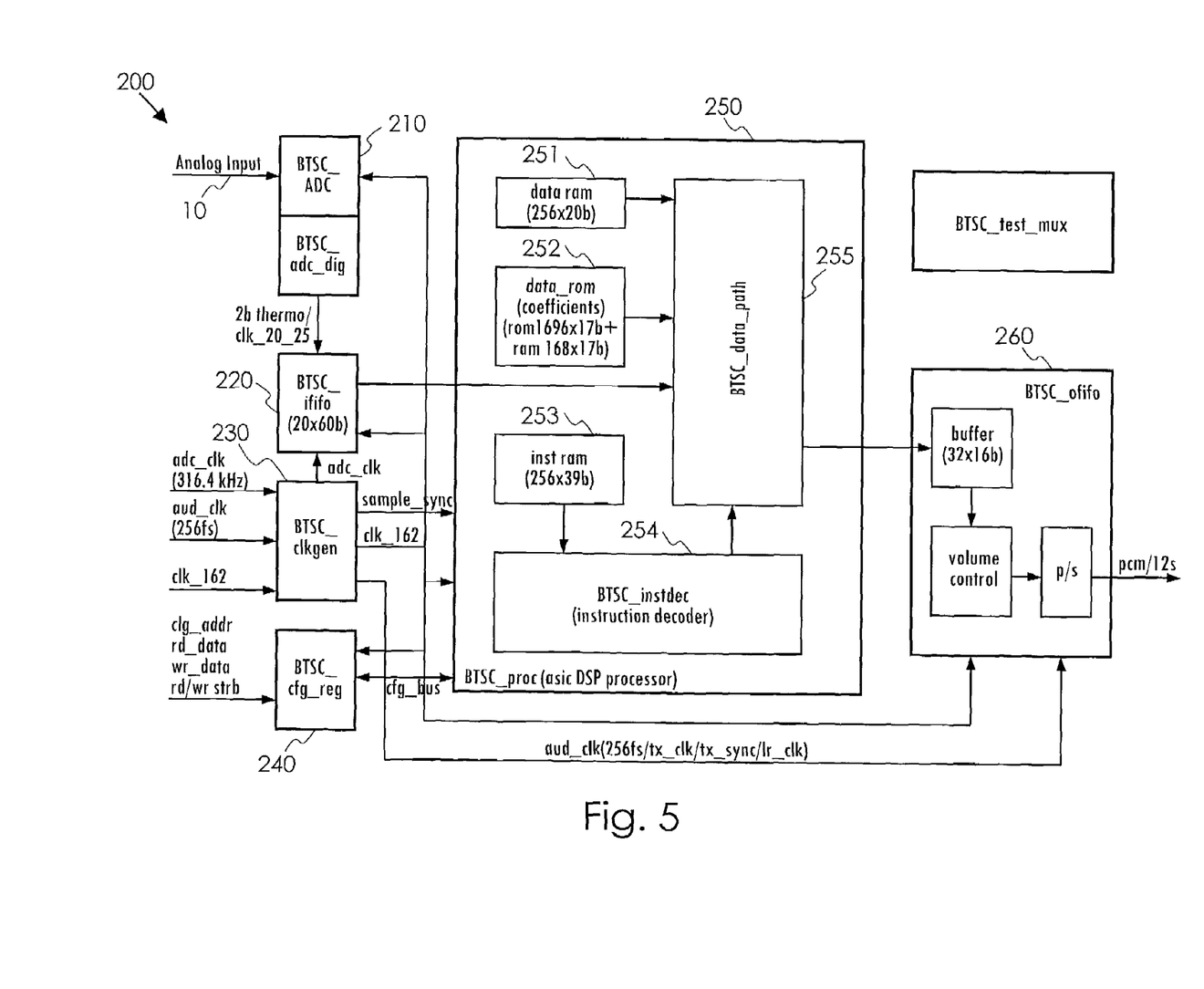
FIG. 5 is a schematic block diagram of a decoding system implemented on an ASIC chip and used to implement the decoding method of FIG. 2 in accordance with an embodiment of the present invention.

FIG. 5 is a schematic block diagram of a decoding system 200 implemented on an ASIC chip and used to implement the decoding method 100 of FIG. 2 in accordance with an embodiment of the present invention.

System 200 comprises various blocks implemented on an ASIC chip in accordance with an embodiment of the present invention. Block 210 is a sigma-delta analog-to-digital (A/D) conversion block operating on composite analog audio signal 10 and performing the function of step 110 in FIG. 2 to generate a low noise, high resolution composite digital audio signal 11. Block 230 is a clock generation block generating clock signals of 20.25 MHz, 316.4 KHz, and buffer clock signals related to the standard output sampling rates from a master clock signal of 162 MHz. The clock signals are used in the multi-channel audio signal decoding process of FIG. 2. Block 250 is a DSP processing block that performs many of the functions of the decoding process of FIG. 2. Block 220 is an input buffer block connected between the AID conversion block 210 and the DSP processing block 250 and is used to transfer composite digital audio signal data 11 into the DSP processing block 250. A configuration register block 240 interfaces to DSP processing block 250, input buffer block 220, and A/D conversion block 210 to provide configuration data to the system 200. Output buffer block 260 interfaces to DSP processing block 250 and clock generation block 230 to output standard audio output signals at standard audio output rates such as 32 KHz, 44.1 KHz, and 48 KHz in accordance with an embodiment of the present invention.

In accordance with an embodiment of the present invention, DSP processing block 250 includes two port data RAM memory 251 for temporary storage of data. DSP processing block 250 also includes coefficient ROM/RAM memory 252 for storing sets of coefficients used in the digital multi-channel audio signal decoding process of FIG. 2. Also included in DSP processing block 250 are instruction RAM memory 253 and instruction decoder 254. Instruction RAM memory 253 stores a set of instructions 300 to be executed by the DSP processing block 250 (see FIG. 7). Instruction decoder 254 interprets the set of instructions 300 in instruction RAM memory 253. In accordance with an embodiment of the present invention, the set of instructions 300 include those defined in FIG. 7 and are used to perform the functions of FIG. 2. Finally, DSP processing block 250 includes a five-stage pipelined data path 255 to execute the set of instructions 300 of FIG. 7.

Figure 6:
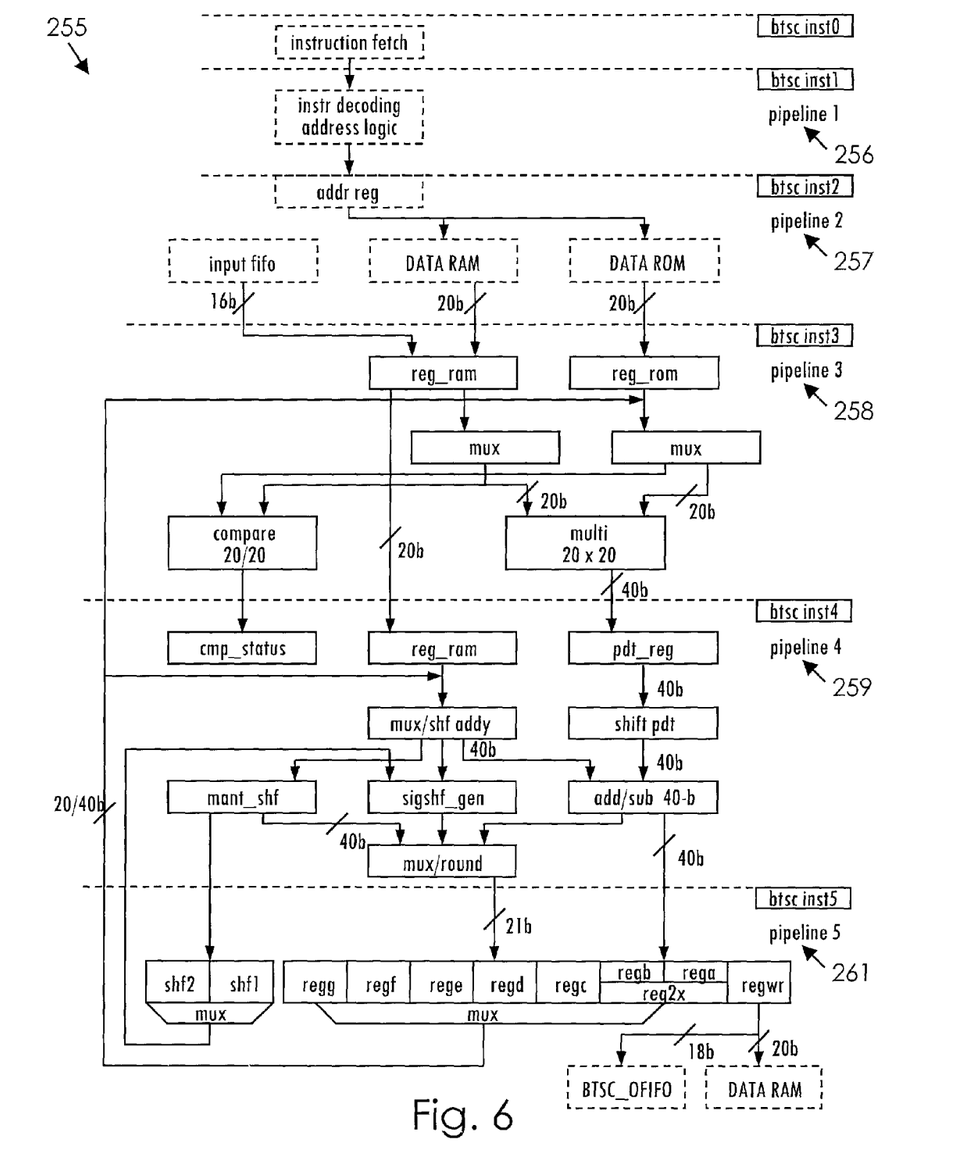
FIG. 6 is a flowchart illustration of the data path processing performed by the pipelined decoding system of FIG. 5 in accordance with an embodiment of the present invention.

FIG. 6 shows the five-stage pipelined data path 255 in accordance with an embodiment of the present invention. The 5-stages include memory address calculation stage 256, memory data fetch stage 257, multiplication stage 258, accumulation/mantissa-generation/signal-shifter stage 259, and registers/memory-write stage 261.

Figure 7:
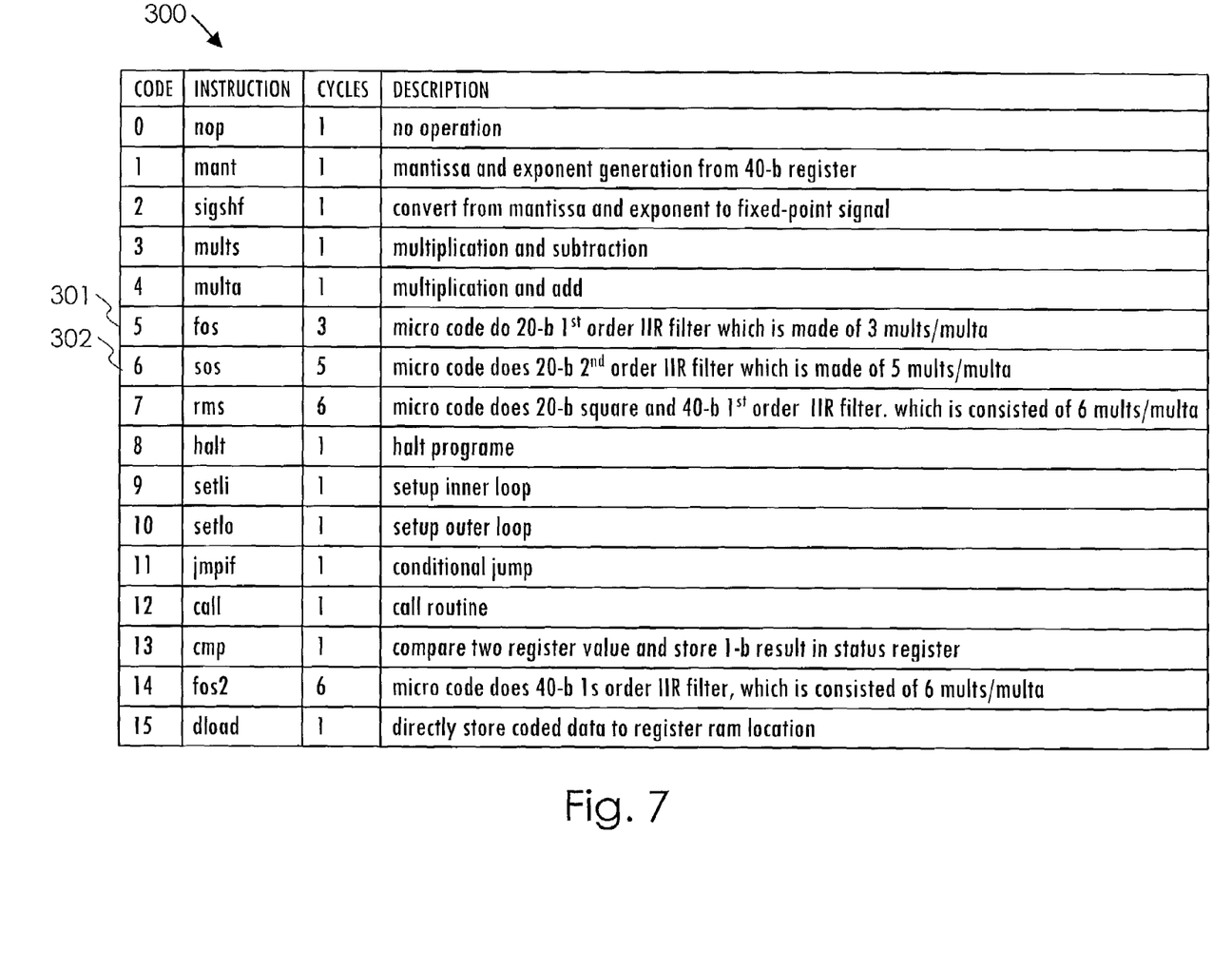
FIG. 7 is a table of instructions that may be implemented by the data path processing of FIG. 6 in accordance with an embodiment of the present invention.

The five-stage pipelined data path 255 along with the set of instructions 300 are used to execute the decoding functions of FIG. 2 including digital amplitude compensation 115, digital channel demodulation and filtering 120, DBX decoding 130, re-matrixing 140, and sampling rate conversion 150.

A feature of a preferred embodiment of the present invention is that instruction 5 (301), 20-bit first-order IIR filtering, may be performed by the five-stage pipelined data path 255 in no more than three clock cycles. Another feature of a preferred embodiment of the present invention is that instruction 6 (302), 20-bit second-order IIR filtering, may be performed in no more than five clock cycles.

The various blocks illustrated in FIG. 5 may be combined or separated according to various embodiments of the present invention within the ASIC chip or may be separated and implemented over more than one chip.

In summary, certain embodiments of the present invention use several stages of digital signal processing where each subsequent stage of the digital multi-channel decoding process is performed at the lowest sampling rate that yields acceptable performance for that stage. As a result, certain embodiments of the present invention afford an approach to achieve efficient, low cost, low power, digital multi-channel audio signal decoding of BTSC audio signals in the digital domain.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for performing digital multi-channel audio signal decoding, said system comprising:

a sigma-delta analog-to-digital (A/D) conversion block operating on a composite analog audio signal to generate a composite digital audio signal;

a clock generation block generating clock signals used in said multi-channel audio signal decoding;

a DSP processing block including a multi-stage pipelined data path performing certain digital multi-channel audio signal processing functions in response to a set of instructions;

an input buffer block connected between said sigma-delta A/D conversion block and said DSP processing block to transfer said composite digital audio signal to said DSP processing block;

a configuration register block interfacing to at least said DSP processing block, said input buffer block, and said sigma-delta A/D conversion block; and an output buffer block interfacing to at least said DSP processing block and said clock generation block to output standard audio output signals at standard audio output rates.

2. A system for performing digital multi-channel audio signal decoding, said system comprising:

a sigma-delta analog-to-digital (A/D) conversion block operating on a composite analog audio signal to generate a composite digital audio signal;

a clock generation block generating clock signals used in said multi-channel audio signal decoding; and a DSP processing block including a multi-stage pipelined data path performing certain digital multi-channel audio signal processing functions in response to a set of instructions, wherein said DSP processing block further includes:

data memory for temporary storage of data;

coefficient memory for storing sets of coefficients used in said digital multi-channel audio signal decoding;

instruction memory for storing said set of instructions; and an instruction decoder for interpreting said set of instructions.

3. A system for performing digital multi-channel audio signal decoding, said system comprising:

a sigma-delta analog-to-digital (A/D) conversion block operating on a composite analog audio signal to generate a composite digital audio signal;

a clock generation block generating clock signals used in said multi-channel audio signal decoding; and a DSP processing block including a multi-stage pipelined data path performing certain digital multi-channel audio signal processing functions in response to a set of instructions, wherein said multi-stage pipelined data path comprises:

a memory address calculation stage;

a memory data fetch stage;

a multiplication stage;

an accumulation/mantissa-generation/signal-shifter stage; and a registers/memory-write stage.

4. A system for performing digital multi-channel audio signal decoding, said system comprising:

a sigma-delta analog-to-digital (A/D) conversion block operating on a composite analog audio signal to generate a composite digital audio signal;

a clock generation block generating clock signals used in said multi-channel audio signal decoding; and a DSP processing block including a multi-stage pipelined data path performing certain digital multi-channel audio signal processing functions in response to a set of instructions, wherein said set of instructions, operating on said multi-stage pipelined data path, is capable of performing at least:

digital frequency compensation of said composite digital audio signal to generate a compensated composite audio signal at a first sample rate;

digital channel demodulation and filtering of said compensated composite audio signal to generate a first single channel audio signal at a second sample rate;

digital channel demodulation and filtering of said compensated composite audio signal to generate a second single channel audio signal at a third sample rate;

DBY decoding of said first single channel audio signal to generate a decoded audio signal at said third sample rate;

re-matrixing of said decoded audio signal and said second single channel audio signal to generate left and right audio signals at said third sample rate; and sampling rate conversion of at least one of said decoded audio signal, said left and right audio signals, and said second single channel audio signal to generate at least one standard audio output signal at a standard audio output rate.

5. A system for performing digital multi-channel audio signal decoding, said system comprising:

a sigma-delta analog-to-digital (A/D) conversion block operating on a composite analog audio signal to generate a composite digital audio signal;

a clock generation block generating clock signals used in said multi-channel audio signal decoding; and a DSP processing block including a multi-stage pipelined data path performing certain digital multi-channel audio signal processing functions in response to a set of instructions;

wherein said set of instructions includes:

an instruction for performing first-order IIR filtering in no more than three clock cycles; and an instruction for performing second-order IIR filtering in no more than five clock cycles.

* * * * *